United States Patent
Blohm et al.

(10) Patent No.: US 8,924,947 B2
(45) Date of Patent: Dec. 30, 2014

(54) DIRECT DEPLOYMENT OF STATIC CONTENT

(75) Inventors: Henning Blohm, Walldorf (DE); Georgi Danov, Wein (AT); Pavel Genevski, Varna (BG); Michael Herrmann, Heidelberg (DE); Shenol Yousouf, Sofia (BG)

(73) Assignee: SAP SE, Walldorf (DE)

( * ) Notice: Subject to any disclaimer, the term of this patent is extended or adjusted under 35 U.S.C. 154(b) by 952 days.

(21) Appl. No.: 12/339,121

(22) Filed: Dec. 19, 2008

(65) Prior Publication Data

US 2009/0228879 A1 Sep. 10, 2009

Related U.S. Application Data

(60) Provisional application No. 61/034,114, filed on Mar. 5, 2008.

(51) Int. Cl.
  *G06F 9/44* (2006.01)
  *G06F 9/445* (2006.01)
  *G06F 11/00* (2006.01)

(52) U.S. Cl.
  CPC ........................... *G06F 8/60* (2013.01)
  USPC ......... 717/168; 717/174; 717/106; 714/38.13

(58) Field of Classification Search
  CPC ............... G06F 8/60; G06F 8/61; G06F 8/65; G06F 9/4411; G06F 9/44505
  USPC .................................................. 717/174, 106
  See application file for complete search history.

(56) References Cited

U.S. PATENT DOCUMENTS

| | | | |
|---|---|---|---|
| 6,289,510 B1 * | 9/2001 | Nakajima | 717/170 |
| 6,779,176 B1 * | 8/2004 | Chambers et al. | 717/169 |
| 7,251,669 B1 * | 7/2007 | Arora | 707/695 |
| 7,277,901 B2 * | 10/2007 | Parker et al. | 1/1 |
| 7,970,821 B2 * | 6/2011 | Baentsch et al. | 709/203 |
| 7,996,814 B1 * | 8/2011 | Qureshi et al. | 717/120 |
| 2002/0147774 A1 * | 10/2002 | Lisiecki et al. | 709/203 |
| 2002/0154646 A1 * | 10/2002 | Dubois et al. | 370/406 |
| 2003/0158928 A1 * | 8/2003 | Knox et al. | 709/223 |
| 2004/0261053 A1 * | 12/2004 | Dougherty et al. | 717/101 |
| 2005/0005200 A1 * | 1/2005 | Matena et al. | 714/38 |
| 2005/0262483 A1 * | 11/2005 | Laird | 717/120 |
| 2006/0143599 A1 * | 6/2006 | Yeh et al. | 717/168 |
| 2007/0055765 A1 * | 3/2007 | Lisiecki et al. | 709/223 |
| 2007/0055972 A1 * | 3/2007 | Brown et al. | 717/174 |
| 2007/0188507 A1 * | 8/2007 | Mannen et al. | 345/532 |
| 2008/0270677 A1 * | 10/2008 | Kolakowski | 711/103 |
| 2009/0100421 A1 * | 4/2009 | Flaming et al. | 717/174 |
| 2009/0300580 A1 * | 12/2009 | Heyhoe et al. | 717/106 |

* cited by examiner

*Primary Examiner* — Don Wong
*Assistant Examiner* — Mohammad Kabir

(57) ABSTRACT

A computerized method and a system for direct deploy of static content. Static content is received at a deployment framework of an application server. The content is forwarded to a content deployment extension (CDE) for implementing the deployment of the content on the applications server. The application server operates in online mode during the deployment. The CDE selects an appropriate content handler to handle the deployment of the content. The content is deployed by the content handler on the application server in online mode. The CDE receive a feedback from the deployment of the static content.

20 Claims, 4 Drawing Sheets

FIGURE 1A – PRIOR ART

DIRECT DEPLOYMENT OF STATIC CONTENT

This application claims priority of U.S. Provisional Patent Application No. 61/034,114, entitled "CONTENT DEPLOYMENT EXTENSION", filed Mar. 5, 2008.

FIELD OF INVENTION

The field of the invention relates generally to electronic data processing and more specifically to deployment of content data components in a computer system.

BACKGROUND OF THE INVENTION

Computer systems execute plurality of software components in order to perform required functionality. Every computer system provides a set of services or a framework for installation of the software components that have to be executed. In addition to the installation of executable software components, computer systems install or deploy static content data components. For example, static content may include source code, blob data, knowledge data. In general, static content data components are not executed in the way the application software components are executed. As a rule, the installation of content data, either static or executable, on a computer system requires the computer system to be in offline mode. Offline mode means that no application is executed and no business services are provided. Thus, failures and collisions are avoided if the executed applications have to access data that is affected by the installation.

When executable data content is installed, the offline mode is necessary, as the executable components plug into the application logic. The applications on the computer system have to be restarted with the new functionality. However, regarding the static content data, such restart of the applications may not be necessary. The static content data provides input for the applications running on the computer system. When the static content is deployed in offline mode, usually the content is delivered at a specific place in the computer system. The correctness of the content and the delivery can be confirmed just after the applications start to access the deployed content.

The current approach for installing static content has several disadvantages. The deployment framework cannot get any useful feedback about the deployment status, as there is no integration between static content recipients and the deployment framework, especially when the deployment is performed in offline mode. When started, the applications that access the static content have no standard way to inform a system administrator if the deployment was not successful. It will be much more efficient if the applications that access the static content participate in its deployment.

SUMMARY OF THE INVENTION

A computerized method and a system for direct deploy of static content are described. Static content is received at a deployment framework of an application server of a computer system. The content is forwarded to a content deployment extension (CDE) for implementing the deployment of the content on the applications server. The application server operates in online mode during the deployment. The CDE selects an appropriate content handler to handle the deployment of the content. The content is deployed by the content handler on the application server in online mode.

BRIEF DESCRIPTION OF THE DRAWINGS

A better understanding of the present invention can be obtained from the following detailed description in conjunction with the figures of the accompanying drawings in which like references indicate similar elements. It should be noted that references to "an" or "one" embodiment in this disclosure are not necessarily to the same embodiment, and such references mean at least one.

FIG. 1A illustrates a block diagram of a system for deploying static content on an application server in a computer system, according to prior art.

DETAILED DESCRIPTION

Figure 1B:
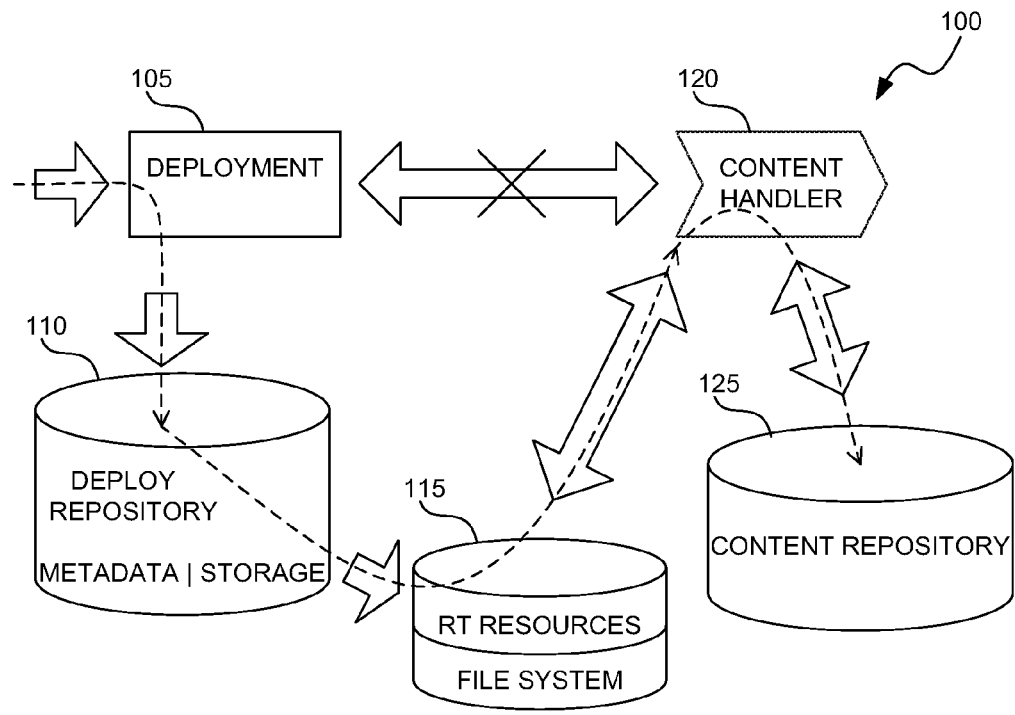
FIG. 1B illustrates a block diagram of a system for deploying static content on an application server in a computer system, according to one embodiment of the invention
Figure 1B:
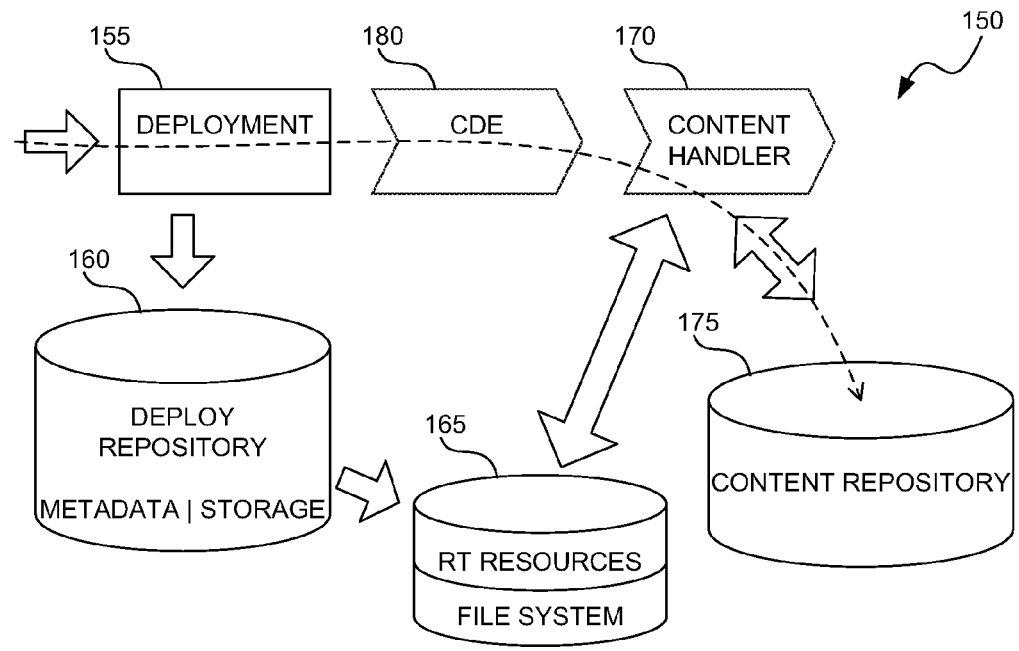

There are different software platforms for building computer systems provided by different vendors. In most of the cases, the platforms are compliant with a publicly recognized specifications. For example, a number of vendors, including SAP AG, Sun Microsystems Inc., IBM Corp., provide platforms for building computer systems based on Java™ Enterprise Edition (Java EE™) specification. In this document are referred computer system modules that are common for SAP NetWeaver™ platform, compliant with Java EE™ specification. However, for one of ordinary skill in the art is obvious that other platforms based on different specifications are also applicable to embody of the invention.

FIG. 1A is a block diagram of system 100 for deploying static content on an application server. The basic elements of system 100 include deployment framework 105, deploy repository 110, content handler 120 and content repository 125. Deployable content is received at deployment framework 105. Deployment framework stores the content in deploy repository 110 before deploying it. Deploy repository 110 store metadata associated with the content. The metadata describes the content and how it is deployed, e.g. linked to the existing content.

Prior art deployment architecture allows only engine services (core components) of the application server to perform the deployment and lifecycle operations. Additional restriction is the requirement that deployment is performed while engine of the application server is in offline mode where no applications are running. Block 115 illustrates runtime resources and file system resources that are accessed by core engine services during the deployment. Runtime resources may include, for example, operative memory space, threads of execution of different service components, classloader objects, etc. File system resources are stored on the local file system of the application server. The file system is a method for organizing storing and organizing data locally by the application server. When the computer system is built as a cluster of a plurality of application servers, file system resources are propagated into a cluster file system encompassing different cluster instances.

Content handler 120 operates in the offline mode of the application server to deploy the content. Content handler 120 installs, updates or removes the content on the application server. For installing the content, content handler 120 accesses the stored information at deploy repository 110 and, in accordance with the metadata requirements, installs it on content repository 125. When static content is deployed, content handler 120 may simply place the content received from deploy repository 110 to content repository 125. This is how the deployment process is performed in the prior art systems.

In this document, the terms "static content", "static content data components", "passive content", and "inactive content" means content artifacts that do not have lifecycle. This kind of content is also deployable on the application server. The static content is packed in the standard way, for example, with Software Delivery Archive (SDA). The term "lifecycle" of a content means that when it is deployed, the content items could be started, stopped, activated and de-activated. In other words, in this document, content has lifecycle when it could be executed. Software applications that are deployable on the application server have lifecycle.

FIG. 1B is a block diagram of system 150 for deploying static content on an application server. System 150 includes the same modules as described with respect to FIG. 1A. System 150 includes deployment framework 155, deploy repository 160, content handler 170, content repository 175, and block 165 for runtime resources and file system. In addition, system 150 includes content deployment extension (CDE) 180, according to one embodiment of the invention. This service is invoked by deployment infrastructure to handle deployment of static content. As illustrated on FIG. 1B with arrows, static content is recognized by deployment framework 155 and is forwarded to CDE 180.

CDE 180 is executed as a system service by the application server of the computer system. CDE 180 may be a plug-in extension to deploy framework 155 that is responsible for the delivery of content of static nature. In this sense, CDE 180 can be viewed as a simplified model of deploy framework 155 which serves best the requirements of those stakeholders that do not need to use the full functionality of deploy framework 155 itself. CDE 180 may implement only content relevant operations as deploy, update and remove.

CDE 180 calls an appropriate content handler 170 to execute the deployment of the static content. During this process, CDE 180 does not reserve runtime resources and may not use local file system resources at block 165 for managing the static content deployment. During static content deployment, it is not necessary the application server to run in offline mode. The execution of applications may be allowed. Content handler 165 may include application software modules, or may perform the deployment in communication with running software applications. The application components could access and check the static content. Thus, content handler 170 may provide feedback for the status of the deployment and for the correctness of the static content.

In addition to already described technical advantages, implementation of content deployment extension provides an opportunity to avoid any file system deployment procedures. That would eliminate the risk of file systems that are out of synchronization in a cluster. That would also reduce significantly the instability and would reduce the technical problems in high availability scenarios.

Figure 2:
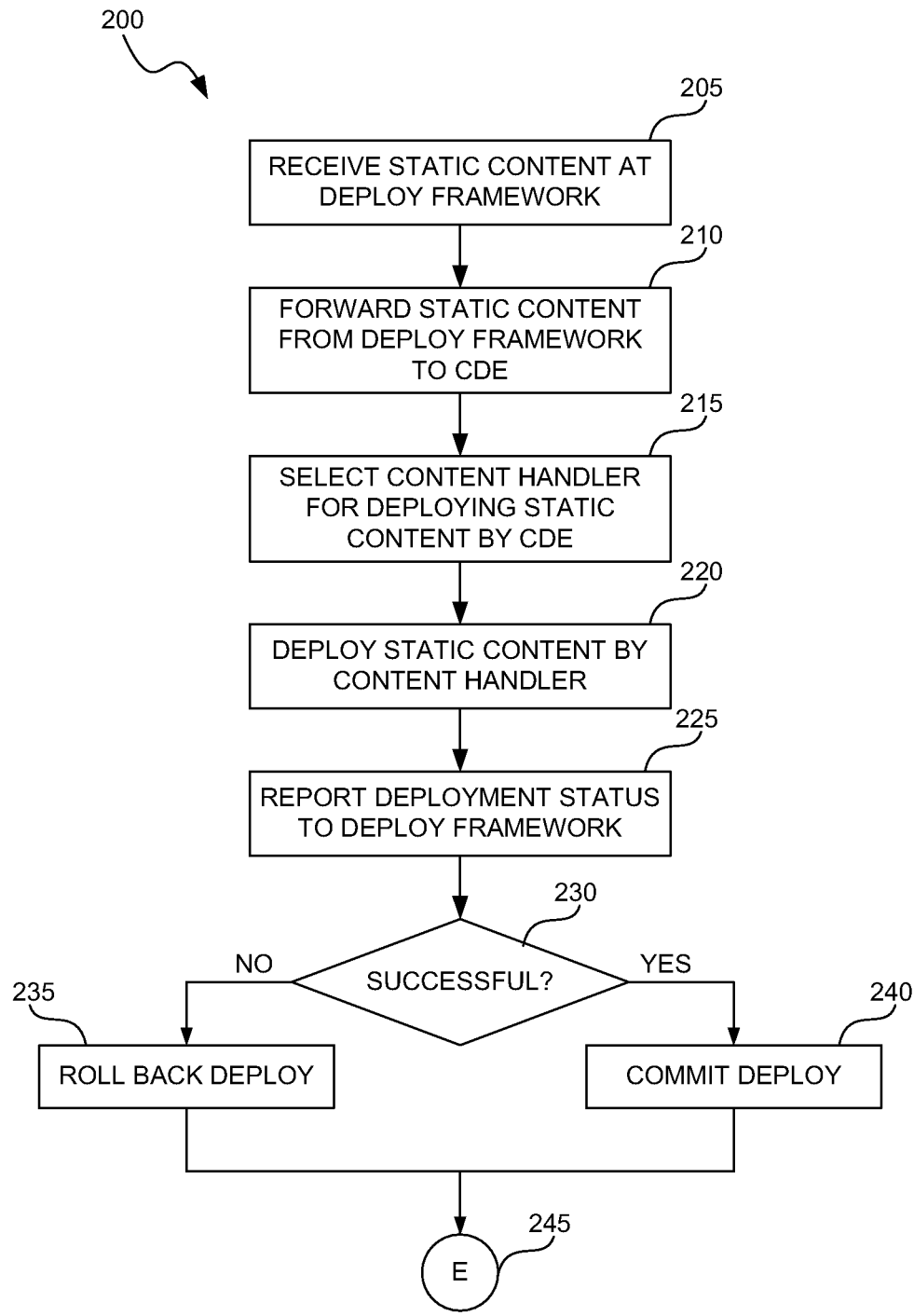
FIG. 2 illustrates a flowchart of a process for deploying static content on an application server in a computer system, according to one embodiment of the invention FIG. 3 illustrated a flowchart of a process for starting of a deployment framework and a extension modules to deploy static content on an application server in a computer system, according to one embodiment of the invention

FIG. 2 is a flowchart 200 of a process for deploying static content on an application server. At block 205, static content is received at a deploy framework. The deploy framework is usually a vendor proprietary solution implemented in the application server on system level. In one embodiment of the invention, a special deploy tool could be connected to the application server to deliver the content for deploying on the server. The content may include a number of content items packed in one or more archive files.

The content items are checked and sorted by their software type. According to the type of the items, different deploy approaches may apply. A specific software type may be attached to static content items. When static content is recognized, it is forwarded to content deployment extension module at block 210. CDE is implemented as an engine service on the application server. It is a system component that provides an application programming interface (API) to one or more content handlers to deploy static content. The static content may be deployed while the application server is in online mode. In this document, online mode means a mode in which application server executes applications, e.g. the application server is operable to execute business requests.

When the passive content is forwarded to the CDE, the CDE selects a content handler at block 215. At block 220, content handler deploys the static content on the application server. The content handler for static content is a module that may be implemented as an application in one embodiment of the invention. Alternatively, the content handler could invoke applications in order to check the correctness of the deployed static content. Such implementation of the content handler is allowable when the deployment is executed in online mode of the application server.

There are one or more content handlers for deploying different types of static content. Every content handler may be responsible for deploying of a special type of static content. In such a case, the CDE selects the content handler in accordance with the type of the static content.

Content handlers register their interest about certain types of content with the CDE. The CDE serves as a dispatcher for all static content items that are processed. Those content items are forwarded to the relevant content handler for further deployment. According to one embodiment of the invention, there are three types of static content. The types are content software subtype, file name, and file extension, e.g. ".xar" for extensible markup language (XML) applications. Only one handler per subtype can be registered with the CDE. The basic responsibility of the CDE is to match the types of the provided content items with the relevant content handlers.

At block 225, a feedback of the deployment is reported to the deploy framework by the CDE. The deploy framework use the feedback and initiate respective action. At block 230, the feedback is analyzed to conclude whether the deployment of the static content is successful or not. If the deployment is not successful, at block 235, the deployment is rolled-back. If the deployment is successful, the deployment is committed at block 240. The process ends at block 245.

The process for deployment of static content in online mode, as described in reference with FIG. 2, provides business advantages as well. The business benefits may be measured by factors as Total Cost of Ownership (TCO) for a computer system. The TCO is improved thanks to the simplified deployment process, the dully provided feedback, the availability of the computer system to process business requests, etc. Another business related measure could be the total system downtime of the system for a certain period.

Deploy framework, content deployment extension (CDE), content handler, are modules implemented as system services in an application server, according to one embodiment of the invention. In order to work together, certain communication or collaboration contracts must be established between the services. For example, the deploy framework may not forward content to CDE if CDE is not running. Therefore, when an application server starts, all these system components are started in a certain order.

Figure 3:
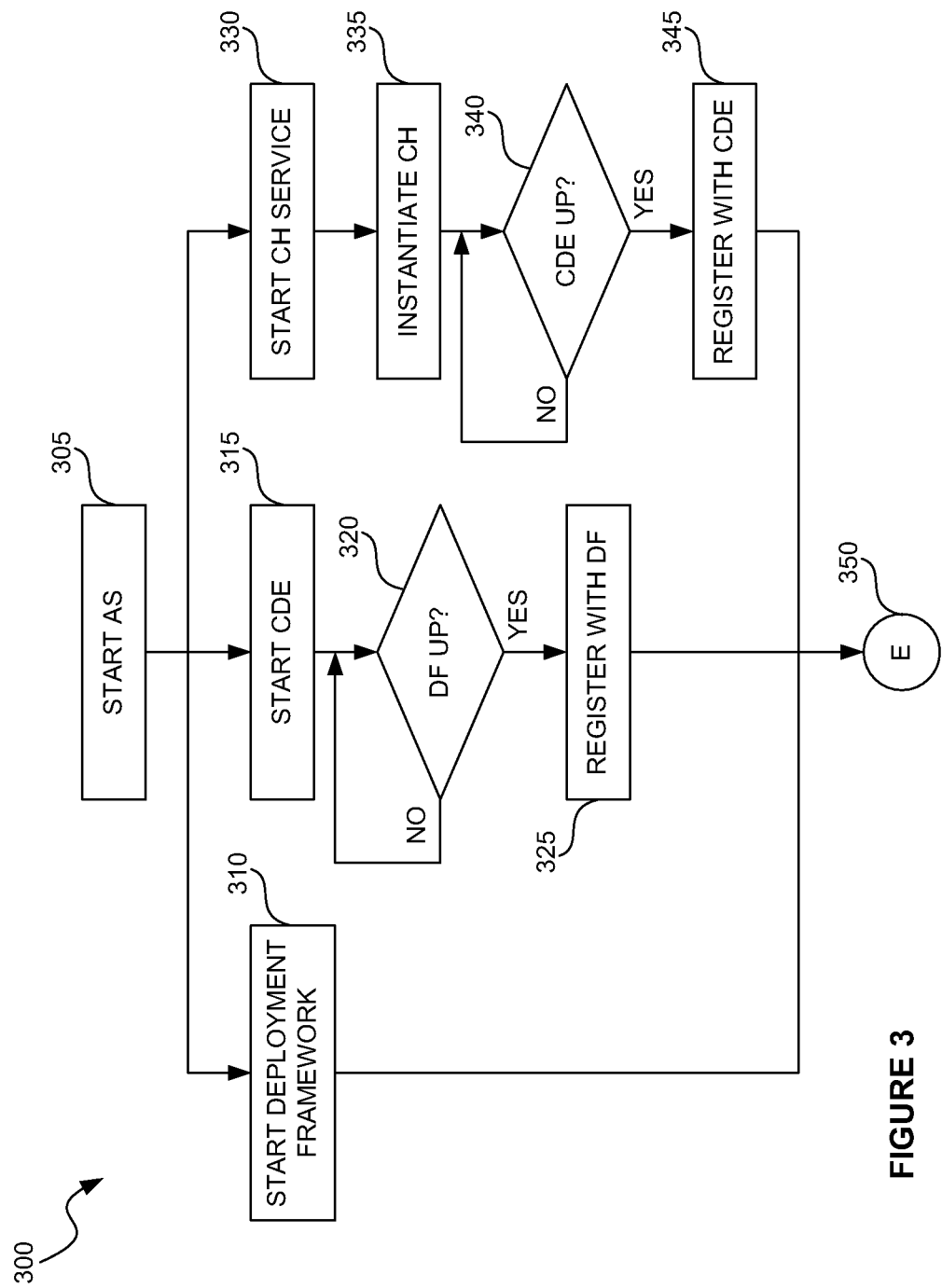

FIG. 3 is a flowchart 300 of a process for starting of a deployment framework and extension modules to deploy static content on an application server of a computer system. When the application server is started, a number of core engine services start execution first. For example, one of the core components is responsible for service management. This core component provides running environment for other system components as system services, interfaces and libraries. The deploy framework may also operate in the running environment provided by this core component. At block 305, application server starts with starting of its core components.

At block 310 the deployment framework is started. In parallel, at block 315, the content deployment extension (CDE) is started. In order to receive content from the deployment framework, the CDE have to establish a communication contract with the deployment framework. At block 320 CDE checks whether the deployment framework is running. When the deployment framework is operational, at block 325, the CDE registers with the deployment framework in order to establish the communication contract.

At block 330 starts a content handler service. The content handler service is responsible for instantiating a content handler at block 335. The content handler may be implemented as an application. Therefore, a system service has to instantiate it in online mode of the application server. At block 340, content handler checks whether the CDE is started. When an event is received that CDE is started, the contain handler service registers the content handler instance with the CDE at block 345. The starting process ends at block 350, where all required services for deployment of static content are up and running and in communications with each other.

Figure 4:
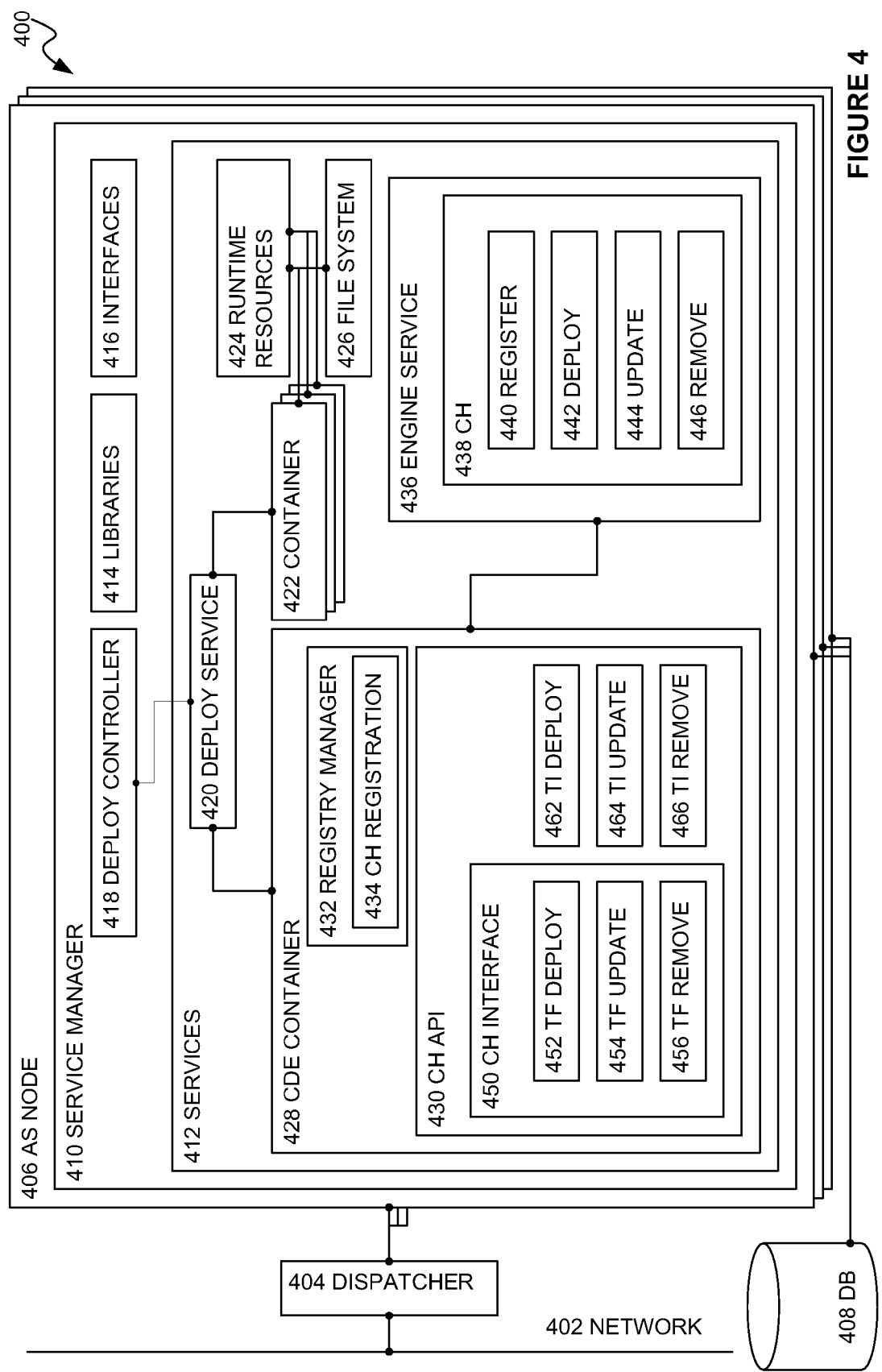
FIG. 4 illustrates a block diagram of a computer system in which is implemented direct deployment of static content, according to one embodiment of the invention.

FIG. 4 is a block diagram of computer system 400. Computer system 400 includes application server (AS) node 406 in which is implemented direct deployment of static content, according to one embodiment of the invention. Computer system 400 may be a distributed computer system where more than one AS node 406 run in parallel. AS nodes 406 of distributed computer system 400 could run as a cluster. Computer system 400 receives business requests for execution via network 402. Network 402 may support TCP/IP transfer protocol. Business requests could be generated by users using online clients to communicate with computer system 400. Business requests are distributed to different AS nodes 406 by dispatcher 404. Application server nodes 406 store common data in database (DB) 408.

When computer system 400 has distributed architecture, each application server node 406 may have the same structure. The structure of application server node 406 includes service manager 410. Service manager 410 is one of the core engine services that execute on AS node 406. Service manager 410 provides running environment for a number of system components, e.g. services 412, libraries 414, interfaces 416. In AS node is implemented a deployment framework that includes deploy controller 418 and deploy service 420 executed within service manager 410.

Deploy controller 418 is entry point for deployment of content to application server node 406. The content to be deployed is received at deploy controller 418. The metadata associated with the content is stored in a deploy repository. The deploy repository is not illustrated and could be established either in the local file system of AS node 406 or in DB 408. The metadata of the received content may show the type of the content, the versions of the content, the software components that will be affected from the deployment, the way the content should be deployed, etc.

The deployment process continues at deploy service 420. Deploy service 420 recognizes the type of the content to be deployed. Active content is deployed through one or more containers 422 for deploying software applications. Containers 422 utilize runtime resources 422 and may use file system 426 during deployment. Deploy service 420 forwards the deployable static content to content deployment extension (CDE) container 428. CDE container 428 is implemented as standard engine service. CDE container 428 implements a standard container application programming interface (API), extended for the purpose of static content deployment. CDE container 428 is registered with deploy service 420.

CDE container 428 provides content handler (CH) API 430 with operations that are relevant for content deployment. During its execution, CDE container 428 does not allocate runtime resources, e.g. threads, classloaders, etc. CDE container 428 selects an appropriate content handler 438 to pass the static contain for deployment. In order to do so, CDE container 428 have to be aware for the instantiated content handlers 438. According to one embodiment of the invention, CDE container 428 provides to content handlers 438 distributed logical transactions, access to common deployable metadata, access to a specific database storage, etc.

Every content handler 438 may be coupled with engine service 436, written specifically for this handler. On its start, engine service 436 creates an instance of content handler 438 and registers a container event listener (not illustrated). This listener is automatically notified for the start of any other service and at the moment when an event about CDE Container 428 start is received, engine service 436 registers the content handler instance 438 with CDE container 428 through Registry Manager 432. Engine service 436 uses a method register 440 provided by Registry Manager 432 for this purpose. Registry manager 432 stores CH registrations 434 for all instantiated content handlers 438.

CDE container 428 checks the type of the received static content and selects an appropriate content handler 438 from registered content handlers 434. Each content handler 438 implements an interface, which has a method that returns registration information. This information is used by CDE container 428 for acquiring knowledge about the interests of content handler 438 in certain content type. Based on the interest and the type of the received content, CDE container 428 selects appropriate content handler 438.

Every content handler 438 has to do the internal processing in its own transaction context. Transactions are the contract between CDE container 428 and content handlers 438 for performing necessary deploy operations. For every operation, a transaction is specialized. In the most common case, content handler 438 provides deploy 442, update 444 and remove 446 transactions. The transactions themselves should support the standard operations of begin, rollback and commit. CDE container 428 is responsible for calling these operations at the relevant moment. For example, rollback is automatically called after a failed deployment. Content handlers 438 just have to implement the internal logic.

Through CH interface 450, CDE container 428 instantiates transaction factories for 452, 454 and 456 for the three basic types of deployment transactions that are supported by content handler 438. These transactions are deploy 442, update 444 and remove 446. Corresponding transaction factories in CDE container 428 are transaction factory (TF) deploy 452, TF update 454 and TF remove 456. CDE container 428 uses transaction factories to instantiate a transaction corresponding to the action to be performed with the content. Transaction instance (TI) deploy 462 is instantiated when the content will be deployed by content handler 438, TI update 464 is instantiated when the content will be updated, and TI remove 466 is instantiated when the content has to be removed by content handler 438.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Reference throughout this specification to "one embodiment" or "an embodiment" means that a particular feature, structure or characteristic described in connection with the embodiment is included in at least embodiment of the invention. Thus, the appearance of the phrases "in one embodiment" or "in an embodiment" in various places throughout this specification are not necessarily all referring to the same embodiment. Furthermore, the particular features, structures or characteristics may be combined in any suitable manner in one or more embodiments.

What is claimed is:

1. A computerized method comprising:
    receiving a content having attached at least one specific type of content at a deployment framework of an application server, wherein the deployment framework includes one or more system services running on the application server;
    recognizing static content from the received content based on the attached at least one specific type; and
    deploying the static content on a node of the application server without interrupting the availability of the application server node to process business requests and while the application server node is executing one or more business requests.

2. The method of claim 1, wherein the application server is a cluster of a plurality of application server nodes.

3. The method of claim 1, wherein recognizing the static content comprises:
    reading metadata associated with the content deployable on the application server.

4. The method of claim 1, wherein deploying the static content further comprises:
    starting a content deployment extension (CDE) as a system service at a startup of the application server; and
    providing information to the deployment framework that the CDE is running.

5. The method of claim 4, wherein deploying the static content comprises:
    instantiating a content handler service at startup of the application server to deploy the static content on the application server while the application server is operable to execute business requests, the content handler service including one or more of system software components and application software components; and
    registering the content handler service with the CDE, when the CDE is started.

6. The method of claim 5 further comprising:
    associating a specific type of static content with the content handler; and
    comparing the at least one specific type of the received content with the specific type associated with the content handler.

7. The method of claim 5, wherein deploying the static content comprises:
    invoking an execution of a deploy method of the content handler to receive and deploy the static content in communication with at least one software application running on the application server node to access the static content.

8. The method of claim 7 further comprising:
    receiving a status of the execution of the deploy method at the CDE;
    committing the deployment of the static content when the execution is successful; and
    rolling-back the deployment of the static content when the execution is unsuccessful.

9. A computer system comprising:
    operative memory to store instructions executed at the computer system to generate:
    an applications server to execute a plurality of computer applications;
    a deployment framework to deploy the plurality of computer applications on the application server;
    a content deployment extension (CDE) in communication with the deployment framework to implement a deployment of a static content on a node of the application server while the application server node is executing one or more business requests, the static content is received at the deployment framework; and
    a content handler in communication with the CDE to deploy the static content on the application server node without interrupting the availability of the application server node to process business requests and while the application server node is executing one or more business requests.

10. The computer system of claim 9 further comprising:
    a content handler engine service to instantiate the content handler and register the content handler with the CDE, when the CDE is started.

11. The computer system of claim 9, wherein the application server is a cluster of a plurality of application server nodes.

12. The system of claim 9, wherein the CDE comprises:
    a registry manager to register the instantiated content handler; and
    a content handler application programming interface (API) to provide the content handler with relevant content deployment functionality while the application server executes one or more computer applications to provide business services.

13. The system of claim 9, wherein the content handler comprises:
    a register module to register the content handler with the CDE;
    a deploy module to deploy static content of a specific type in the application server in online mode;
    an update module to update an already deployed static content of the specific type in the application server in online mode; and
    a remove module to remove an already deployed static content of the specific type in the application server in online mode.

14. A non-transitory computer-readable medium storing instructions, which when executed cause a computer system to:
    receive a static content of a content deployable on an application server;
    invoke an application software module executing on the application server to handle the static content based on a specific type of the static content; and deploy the static content on a node of the application server, while the application server node is executing one or more business requests.

15. The computer-readable medium of claim 14, wherein receiving the static content comprises:
   recognizing the static content of the content deployable on the application server.

16. The computer-readable medium of claim 15, wherein recognizing the static content comprises:
   reading metadata associated with the content deployable on the application server.

17. The computer-readable medium of claim 14, wherein invoking the application software module comprises:
   registering a plurality of applications software modules to handle static content, wherein each of the plurality of application software modules handles at least one different type of a plurality of specific types of static content.

18. The computer-readable medium of claim 14, wherein invoking the application software module comprises:
   executing a system service as a deployment extension of a runtime environment of the application server;
   receiving the static content at the system service; and
   calling the application software module by the system service based on the specific type of the static content.

19. The computer-readable medium of claim 14, wherein deploying the static content comprises:
   deploying the static content by the application software module in communication with at least one of a plurality of application software components running on the application server.

20. The computer-readable medium of claim 14, wherein deploying the static content comprises:
   accessing the static content during the deployment by at least one of a plurality of application software components running on the application server node to report one or more of a deployment status and a correctness of the static content.

\* \* \* \* \*